United States Patent [19]

Miyao et al.

[11] 3,999,035
[45] Dec. 21, 1976

[54] LAY DOWN ARC WELDING METHOD

[75] Inventors: Nobuaki Miyao, Neyagawa; Kunihiro Kosuge, Osaka; Saijiro Yoshida, Toyonaka; Kanaaki Uchiyama, Osaka; Hiroshi Tanimoto, Osaka; Kazunao Mimaki, Amagasaki; Satoru Goto, Osaka, all of Japan

[73] Assignee: Sumitomo Welding Electrode Co. Ltd., Amagasaki, Japan

[22] Filed: May 27, 1975

[21] Appl. No.: 580,901

Related U.S. Application Data

[63] Continuation of Ser. No. 413,779, Nov. 8, 1973, abandoned, which is a continuation of Ser. No. 287,879, Sept. 11, 1972, abandoned, which is a continuation-in-part of Ser. No. 81,482, Oct. 16, 1970, abandoned.

[52] U.S. Cl. .................. 219/137 R; 219/137 WM; 219/145; 219/146
[51] Int. Cl.² .................... B23K 9/24; B23K 35/02
[58] Field of Search ............. 219/73, 74, 130, 137, 219/145, 146

[56] References Cited

UNITED STATES PATENTS

| | | | |
|---|---|---|---|
| 1,953,942 | 4/1934 | Applegate | 219/146 |
| 2,148,182 | 2/1939 | Applegate | 219/146 |
| 2,587,195 | 2/1952 | Moerman | 219/137 R |
| 3,114,033 | 12/1963 | Elster et al. | 219/146 |

*Primary Examiner*—J. V. Truhe
*Assistant Examiner*—N. D. Herkamp
*Attorney, Agent, or Firm*—Laurence R. Brown

[57] ABSTRACT

A lay down arc welding electrode with improved weld penetration is described. The welding electrode includes a core wire surrounded by flux, a portion of which has been longitudinally removed or has been otherwise made thinner than the flux surrounding the remainder of the arc wire. The direction of arc is adjusted by varying the shapes of core wire and flux. During welding the arc welding electrode rests on a tack weld. This causes directional angle ($\alpha$) to the root of the weld to increase and the divergence angle ($\beta$) to decrease, resulting in improved penetration of disposed metal. An apparatus is described for continuous lay down arc welding using the described arc welding electrode.

5 Claims, 47 Drawing Figures

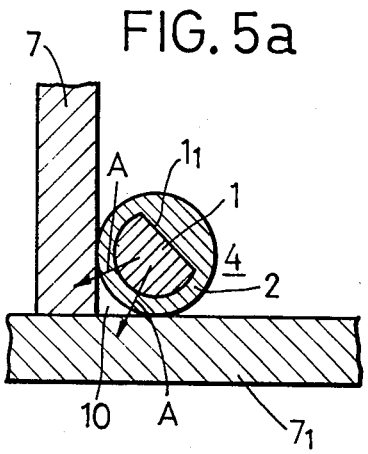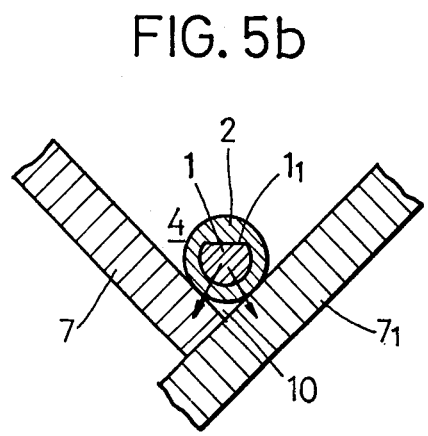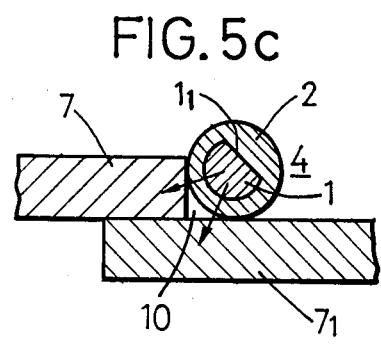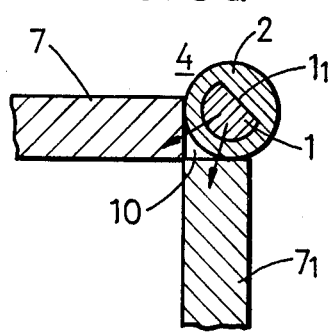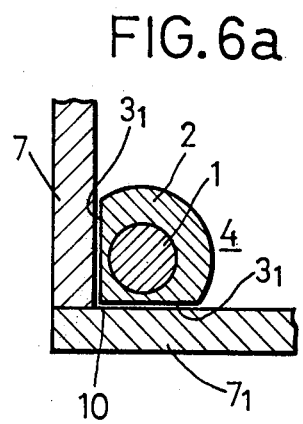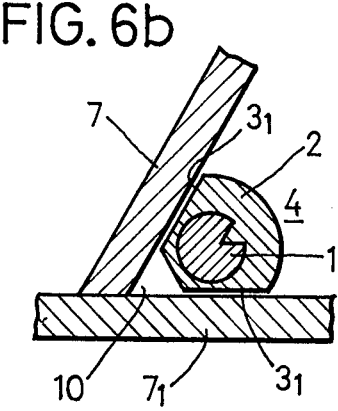

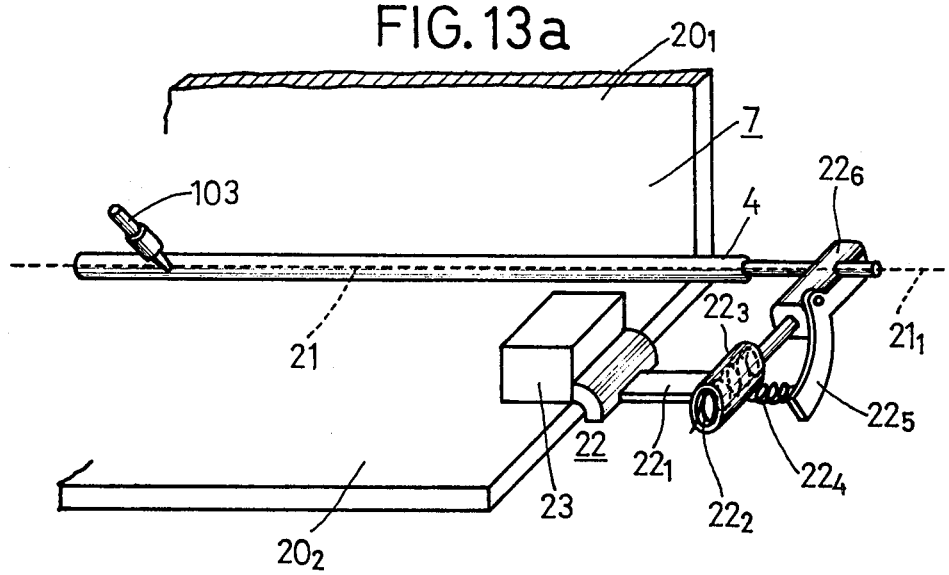
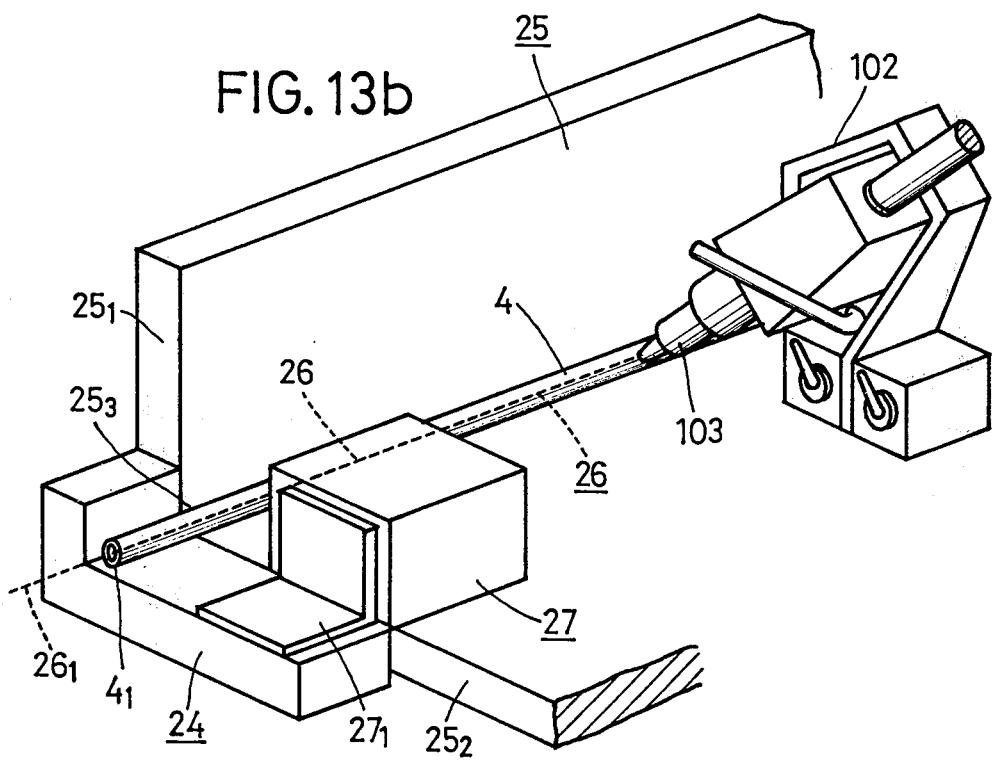

INVENTOR.
Nobuaki MIYAO et al.
BY Lawrence R. Brown
Attorney

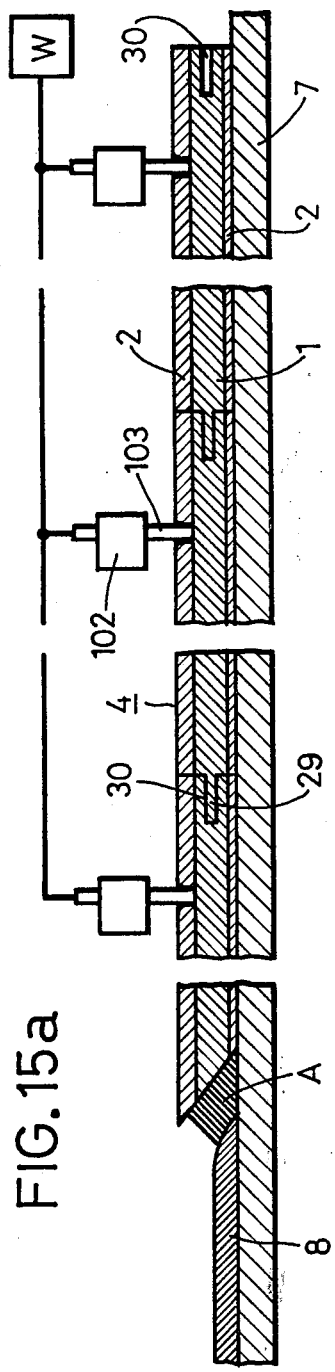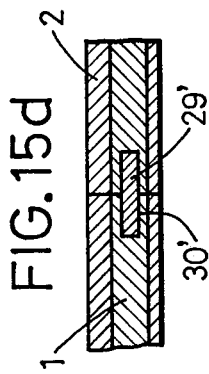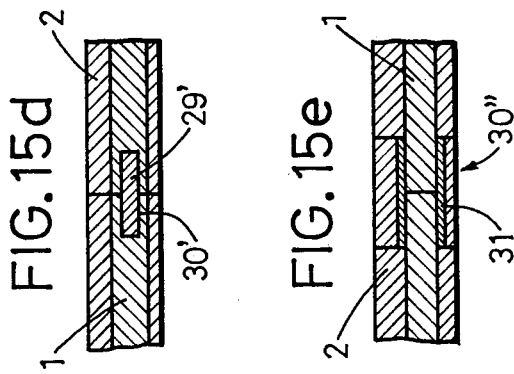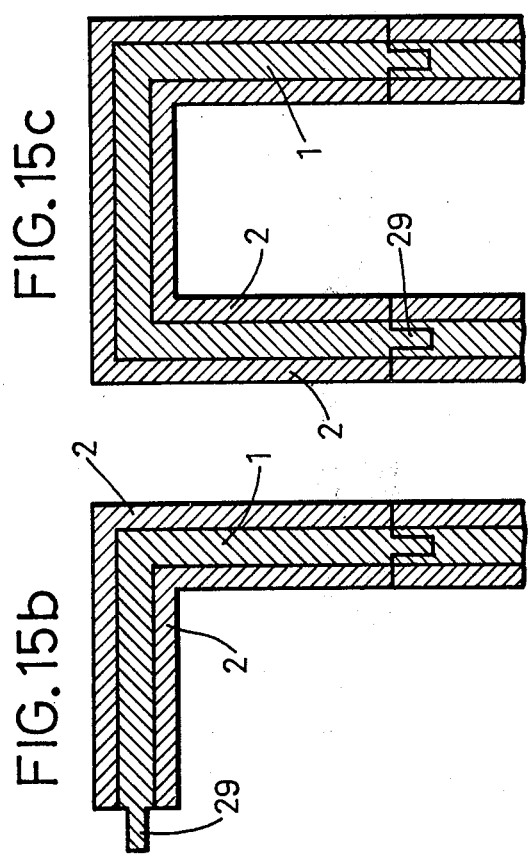

LAY DOWN ARC WELDING METHOD

This is a continuation of application Ser. No. 413,779, filed Nov. 8, 1973 which is a continuation of application Ser. No. 287,879, filed Sept. 11, 1972, which is a continuation-in-part application of application Ser. No. 81,482 filed Oct. 16, 1970 and entitled "Electrode for Lay Down Arc Welding and Apparatus for Continuous Lay Down Arc Welding", all now abandoned.

This invention relates to an electrode for lay down arc welding capable of maintaining good welding conditions by adjustment of the angle of arc with varying shapes of core wire and flux, and to an apparatus for lay down arc welding for use with such electrode. The present invention more particularly relates to lay down arc welding electrodes and continuous lay down arc welding, the electrodes having different flux and core wire shapes for adjustment of the directional and divergence angles of the arc for improving lay down arc welding and the continuous lay down arc welding, and apparatuses necessary therefor.

With the conventional lay down arc welding technique, the directional angle ($\alpha$) of the arc is small and the divergence angle ($\beta$) thereof is large, from which shallow penetration results. Further, continuous beads good in appearance could not be obtained and the mechanical properties were also deficient. These are serious disadvantages in welding. It has been found, in conjunction with the present invention, that besides the directional angle, the divergence angle of the arc plays an important role and establishes an improved lay down arc weld and an improved continuous lay down arc welding method.

Welding has been effected in two steps; tack welding and welding proper. In the prior art, the penetration of welding metal into the base metal was shallow, and thus, the quality of weld was unsatisfactory. This is attributed to the directivity of arc.

An object of the present invention is to provide an electrode for lay down arc welding wherein the directivity of arc is improved by varying the shape of core weld or flux so as to improve the penetration.

Still another object of the present invention is to provide a pressure-holding device for holding an electrode for continuous lay down arc welding.

Still another object of the present invention is to provide a device for welding the front and rear ends of base metal in a continuous lay down arc welding process.

Still another object of the present invention is to provide a weight and a joint for the electrode for continuous lay down arc welding.

In the accompanying drawings:

FIGS. 5a to 5d are illustrative views of the arrangements of the welding electrode of FIG. 4 relative to the parts to be welded;

FIGS. 6a and 6b are illustrative views of the arrangements of still other welding electrodes relative to the parts to be welded;

FIG. 8b is a cross-sectional view of parts being welded with the electrode of FIG. 8a;

FIG. 9b is a view showing the arc of the welding electrode of FIG. 9a;

FIGS. 13a to 13c are perspective views of fillet welding sections showing the welding conditions of the rear end of base metal;

FIGS. 15a to 15e are longitudinally sectional views showing several embodiments of joints for lay down arc welding electrode.

Figure 1A:
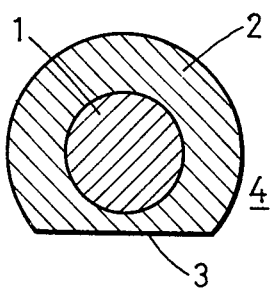
FIGS. 1a to 1n are cross-sectional views showing several embodiments of the lay down arc welding electrode according to the present invention, part of the flux being longitudinally removed.
Figure 1B:
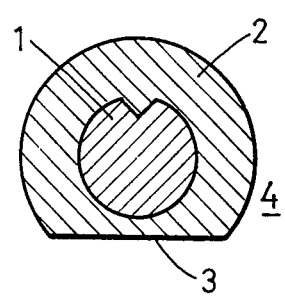
Figure 1C:
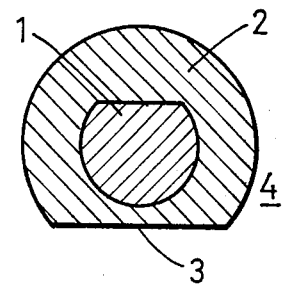
Figure 1D:
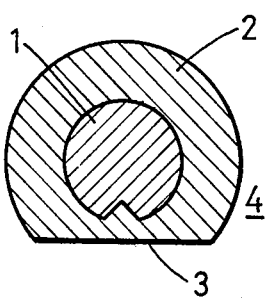
Figure 1E:
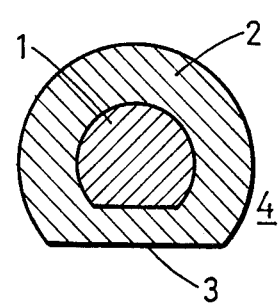

In lay down arc welding electrodes 4 embodied according to the present invention and shown in FIGS. 1a to 1e, reference numeral 1 designates a core wire made of mild steel, special steel or non-ferrous metals and having a different section such as circular, grooved or semi-circular with flat face. The core wire is surrounded by a flux 2, part of which is removed longitudinally to an extent that the core wire is not exposed, thereby to form a flat face 3.

In lay down arc welding electrodes shown in FIGS. 1f to 1n, part of the flux 2 is removed longitudinally so as to form a curved face 5 or a groove 6.

Figure 1F:
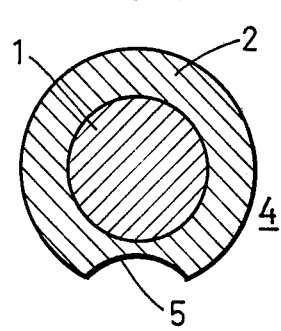
Figure 1G:
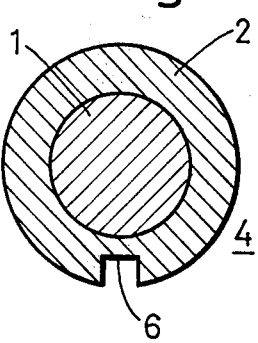
Figure 1H:
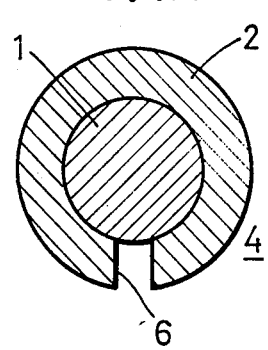
Figure 1I:
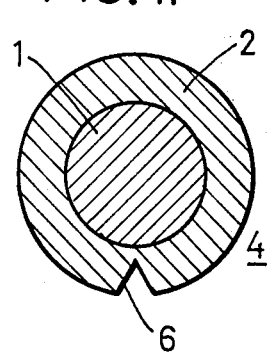
Figure 1J:
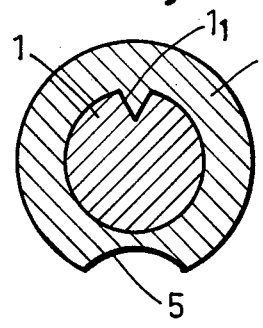
Figure 1K:
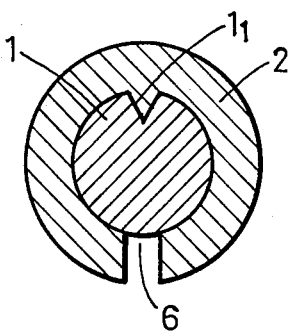
Figure 1L:
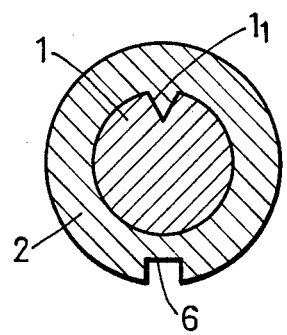
Figure 1M:
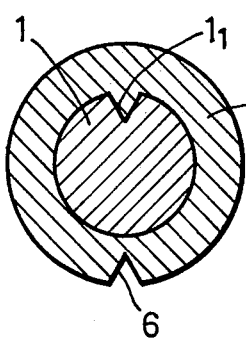
Figure 1N:
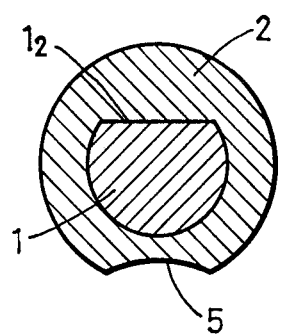
Figure 2:
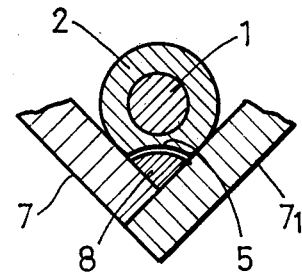
FIG. 2 is a sectional view of parts being welded with the welding electrode of FIG. 1f.
Figure 3A:
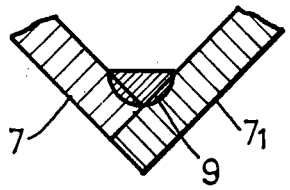
FIG. 3a is an enlarged sectional view showing the weld produced with a conventional electrode.
Figure 3B:
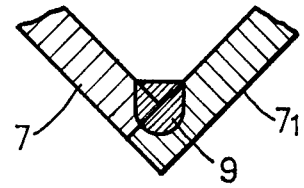
FIG. 3b is a sectional view showing the weld produced on the V-groove of FIG. 2.

As shown in FIGS. 2 and 3b, the welding electrode of FIG. 1f is laid down along the weld line in such a manner that the curved face 5 is opposed to the tack weld 8 between base materials 7 and $7_1$. In this condition, the welding electrode rests stably on the tack weld 8, thus maintaining stable welding. This also causes the directional angle ($\alpha$) to the root of weld to increase and the divergence angle ($\beta$) to decrease, thus remarkably improving the penetration of deposited metal. According to the experiment, the greater effect can be obtained, the smaller the radius of curvature of the curved face is and the nearer the curved face is to the core wire (i.e. the smaller the arc length is). In case of the welding electrodes with a groove, the nearer the bottom of the groove comes to the core wire (i.e. the smaller the arc length is), the greater effect can be attained. The best penetration effect is obtained with a groove width of 4mm for core wires of 6mm in diameter and with a groove of 6mm for core wires of 8mm in diameter.

Figure 4:
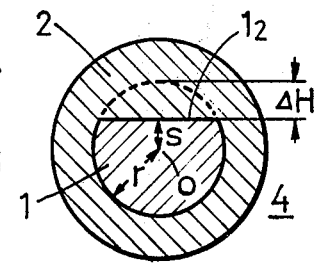
FIG. 4 is a cross-sectional view of still another embodiment of the lay down arc welding electrode according to the present invention.

For embodiments shown in FIGS. 4 and 5a to 5d, the welding electrode 4 comprises a core wire 1 made of mild steel, special steel or non-ferrous metals and having a circular or substantially circular section whose periphery is partially cut to form a flat face $1_2$ and a flux 2 surrounding said core wire 1. In FIG. 4, $o$ designates the center of the circle defined by the edge of the core wire 1, $r$ the shortest distance between the center $o$ and the periphery of the core wire, and $s$ the shortest distance between the center $o$ and the flat face $1_2$. They are so chosen that the ratio of the difference $\Delta H$ between $r$ and $s$ to $r$, $\Delta H/r$, may not exceed 1. A web-side base metal is designated at 7 and a flange-side one at $7_1$. 10 indicates the root thereof.

As shown in FIGS. 5a to 5d, the welding electrode 4 is laid down along the weld line. The arc A is deflected toward the root 10 within a narrow range illustrated by arrows A, thus welding the base materials within the limited range around the root 10. Therefore, the penetration of deposited metal into the weld is improved. Further, the welding is effected with a lower arc voltage than with conventional welding electrodes, so that the beads are made flat and beautiful. The low arc voltage makes the length of arc short, which ensures that the difference in leg length is made under 2mm even for root gaps between web-side and flange-side base metals 7 and $7_1$ exceeding 3mm.

The following table compares conventional welding electrodes having a core wire with and without groove and those proposed herein. The radius of core wire $r$ was 3mm and the welding was performed on the same specimens. Two measurements in millimeters are given for each case.

The lay down welding electrodes 4 embodied according to the present invention and shown in FIGS. 6a and 6b comprise a core wire 1 made of mild steel, special steel or non-ferrous metals and having a circular or grooved section and a flux 2 surrounding said core wire, part of said flux being longitudinally removed to an extent that the core wire is not exposed and correspondingly to the angle between base metals 7 and $7_1$, thereby to form flat faces $3_1$. The root of weld is designated at 10. The use and effect of these welding electrodes are substantially the same as those of the embodiments shown in FIGS. 5a to 5d.

Figure 7A:
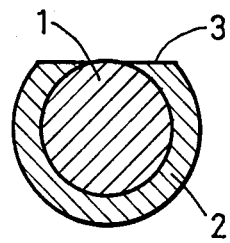
FIG. 7a is a cross-sectional view of still another embodiment of the welding electrode wherein part of the flux is removed to expose part of the core wire.
Figure 7B:
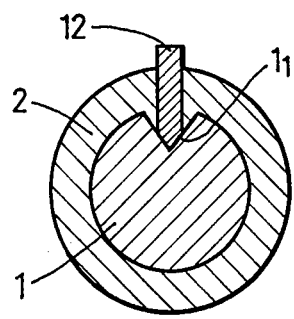
FIG. 7b is a cross-sectional view of still another embodiment of the lay down arc welding electrode wherein one end of a buried current supplying plate is exposed and the other end thereof is connected to the core wire.

In an embodiment shown in FIG. 7a, the core wire 1 is covered with a flux 2 selected from the group of ilmenite, iron powder-iron oxide, lime-titania and low hydrogen fluxes. The top of the flux 2 is removed longitudinally. When this welding electrode is used in a continuous lay down welding apparatus hereinafter explained, a vertically movable current supplying bar is caused to lie against the flat portion of the welding electrode. FIG. 7b shows a welding electrode comprising a core wire 1, a flux 2 and a current supplying plate 12 buried in said flux in such a way that it reaches a groove $1_1$ provided in the core wire 1.

Figure 8A:
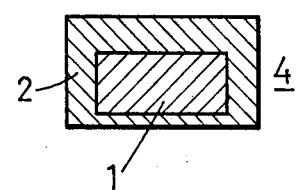
FIG. 8a is a cross-sectional view of a rectangular lay down arc welding electrode embodied according to the present invention.
Figure 8C:
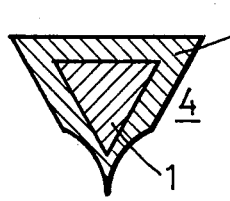
FIG. 8c is a cross-sectional view of a triangular lay down arc welding electrode embodied according to the present invention.
Figure 8B:
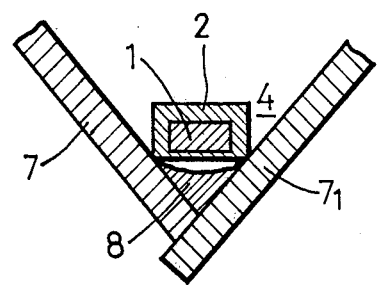

FIGS. 8a and 8b show a rectangular lay down welding electrode used when large bead width is required in multi-layer weldings. This welding electrode 4 comprises a rectangular core wire 1 made of mild steel, special steel or non-ferrous metals and a flux 2 covering said core wire so as to form a rectangular section of the resulting electrode. Numerals 7 and $7_1$ denote base metals and 8 a weld zone produced by multi-layer welding.

The use and effect of this welding electrode are explained below: when welding is performed with this electrode resting on the weld zone 8 produced by multi-layer welding, the core wire 1 exists across the whole area of the weld zone and thus the arc covers substantially uniformly the whole area, thus guaranteeing smooth beads. Since the electrode rests on the weld zone, its stability is also high. The sectional area of the core can be made small. This allows a weld with high impact value to be obtained. Furthermore, formation of wide beads only realized by two passes with conventional circular welding electrodes can be made by one pass, thus ensuring beautiful beads.

Table 1

| | Shape of core wire | Root gap: 1 mm | | | Root gap: 2 mm | | | Root gap: 3 mm | | |
|---|---|---|---|---|---|---|---|---|---|---|
| | Sort | Web-side leg length | Flange-side leg length | Difference in leg length | Web-side leg length | Flange-side leg length | Difference in leg length | Web-side leg length | Flange-side leg length | Difference in leg length |
| Conventional | Circular | Bad directivity of arc Bad appearance of beads | | | '' | | | '' | | |
| | Grooved | 7.2 | 8.6 | 1.4 | 5.2 | 7.7 | 2.5 | — | — | Separate beads |
| | | 8.0 | 9.2 | 1.2 | 6.0 | 9.5 | 3.0 | — | — | '' |
| Claimed Electrode | $\Delta H/r<1.0$ | 7.6 | 8.1 | 0.5 | 5.8 | 7.0 | 1.2 | 5.0 | 6.5 | 1.5 |
| | | 7.0 | 7.9 | 0.9 | 5.4 | 6.7 | 1.3 | 5.1 | 6.9 | 1.8 |
| | $\Delta H/r=1.0$ | 5.3 | 6.5 | 1.2 | 4.8 | 5.9 | 1.1 | 4.5 | 6.3 | 1.8 |
| | | 5.5 | 6.5 | 1.0 | 4.7 | 6.1 | 1.4 | 4.6 | 6.3 | 1.7 |
| | $\Delta H/r>1.0$ | Flux covers beads to make their appearance bad. | | | '' | | | '' | | |

Figure 8D:
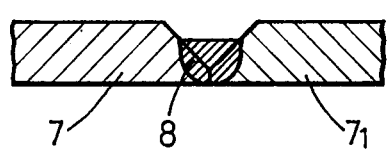
FIG. 8d is a schematic view illustrating the penetration of the welding electrode of FIG. 8c.

FIGS. 8c and 8d show a triangular lay down welding electrode and a weld zone produced thereby. This welding electrode is intended for use in butt welding or for the first layer with groove angle of under 80° in fillet welding. In the prior art, while perfect penetration was obtained for a fillet angle of over 80°, a gap was found beneath the contact part of the first layer for angles smaller than that the thus the penetration was unsatisfactory. According to the present invention, the core wire 1 has a triangular form and the flux is thicker on the side remote from the base metals than on two sides adjacent thereto. The directivity of arc is improved by recessing the flux on the portions to be in contact with the root. The penetration becomes thus perfect because the arc generating point approaches the root and because of increased directional angle and decreased divergence angle of the arc.

Figure 9A:
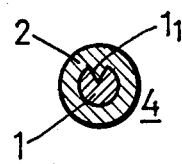
FIG. 9a is a cross-sectional view of a lay down arc welding electrode using a powdery high-melting material as the flux.

In FIG. 9a, a shallow longitudinal groove $1_1$ is provided in the core wire 1, which is covered with a flux 2 compounded of high melting material powder.

Figure 9B:

The welding electrode thus produced is placed on base metals 7 for arc welding. In this case, a large directional angle of the arc A results as shown in FIG. 9b. It will be apparent that better lay down welding is possible compared with that obtained by conventional welding electrodes.

Several embodiments of fluxes containing percentages by weight of high melting material are tabulated below:

It has been thus found that a larger amount of high melting point material should not be used. Such welding electrodes are arranged with the groove of the core wire on the opposite side of the base metals, so that the flux on the side of the base metals melts earlier than that on the other side because the latter is thicker than the former. This further increases the directional angle of arc in cooperation with the delay in melting due to interaction with the high melting point material.

Figure 10:
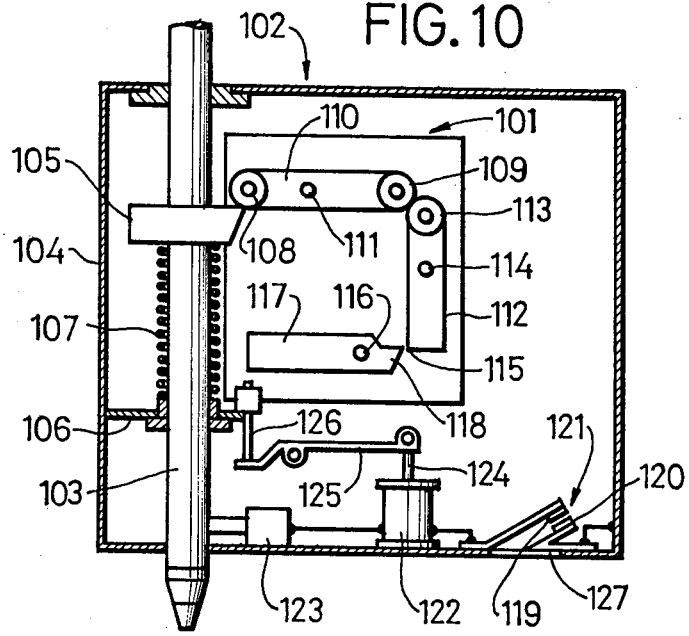
FIG. 10 is a sectional view of a continuous lay down arc welding apparatus embodied according to the present invention.

FIG. 10 shows an embodiment of a mechanism for raising a current supplying bar. The current supplying bar raising mechanism 101 is arranged in a current supplying device 102. The current supplying device 102 is placed above the welding electrode laid down along the weld line. For welding, the tip of the current supplying bar is caused to come into contact with the welding electrode.

The current supplying device 102 comprises a housing 104 and a current supplying bar 103 extending vertically through said housing. The bar 103 is connected at the top to a current supplying line. Provided at the middle part of the bar is a projection 105, under which a spring 107 is arranged to lie against a supporting frame 106 at the other end. The current supplying bar raising mechanism 101 is arranged adjacent to the current supplying bar 103. The mechanism 101 comprises a lever 110 having rollers 108 and 109 at the ends thereof and pivoted by means of a shaft 111, the distance between roller 108 and shaft 111 being Table II

| Ex. | Dia. of core wire (mm) | Shape of V-groove (mm) | Silica sand | Lithol | Sodium oxide | Alumina | Calcium carbonate | Magnesium carbonate | Iron powder | Ferro-manganese | Barium ferrite | Wollas-tonite | Total |
|---|---|---|---|---|---|---|---|---|---|---|---|---|---|
| 1 | 7 | width 1.0 depth 0.1 | 25 | 3 | 2 | 2 | 5 | — | 8 | 13 | 40 | — | 100 |
| 2 | 7 | " | 20 | 3 | 2 | 2 | — | 13 | 10 | 13 | 15 | 20 | 100 |
| 3 | 7 | " | 20 | 3 | 2 | 2 | 15 | — | 10 | 13 | 33 | — | 100 |
| 4 | 7 | " | 20 | 3 | 2 | 2 | — | 30 | 10 | 13 | 18 | — | 100 |
| 5 | 7 | " | 20 | 3 | 2 | 2 | 20 | — | 9 | 13 | 29 | — | 100 |
| 6 | 7 | " | 20 | 3 | 2 | 2 | — | 35 | 9 | 13 | 14 | — | 100 |
| 7 | 7 | " | 18 | 3 | 2 | 2 | 60 | — | — | 13 | — | — | 100 |
| 8 | 7 | width 2.5 depth 0.2 | 25 | 3 | 2 | 2 | 5 | — | 8 | 13 | 40 | — | 100 |

Table III

| | Welding performance | | | Quality of weld | | | |
|---|---|---|---|---|---|---|---|
| Example | Directivity of arc | State of skug | Spatter loss | Shape of beads | Penetration | Quality tested by X-rays | Welding (A) current |
| 1 | Bad | Bad | Much | Bad | Shallow | Bad | 270 |
| 2 | Good | Good | Little | Good | Good | Good | 270 |
| 3 | Rather bad | Rather bad | Much | Bad | Shallow | Good | 270 |
| 4 | Good | Good | Little | Good | Good | Good | 270 |
| 5 | Good | Good | Little | Good | Good | Good | 270 |
| 6 | Rather bad | Rather bad | Rather much | Good | Shallow | Rather bad | 270 |
| 7 | Good | Good | Little | Good | Good | Good | 270 |
| 8 | Good | Good | Little | Good | Average | Good | 270 |

According to the comparison of Examples 1 and 8 in Tables II and III, Example 8 comprising a core wire with a deeper groove has a higher performance when the content of a high melting point powdery material $MgCO_3$ or $CaCO_3$ is low. But, if $CaCO_3$ is 20 to 60% (Examples 5 and 7) and $MgCO_3$ is 13 – 30%, the directional angle ($\alpha$) arc is satisfactorily good as shown in FIG. 9b, even if the groove of the core wire is shallow. Example 6 having a large content of $MgCO_3$ causes rather weak arc and reduces the welding performance.

smaller than that between roller 109 and shaft 111. The arm of the lever 110 on which the roller 109 is provided can thus descend freely by its gravity. Provided perpendicularly to the lever 110 is another vertical lever 112, at the top of which is provided a roller 113 which is able to come into contact with the roller 109. The vertical lever 112 is pivoted near the top by means of a shaft 114. A lever 117 pivoted by means of a shaft 116 comes at the tip 118 into contact with the side edge of the lower portion of the vertical lever 112.

The bottom of the housing 101 has a through hole 127, inside which a thermocouple hving contacts 119 and 120 constituting a heat sensitive section is arranged. The contact 120 is grounded and the contact 119 is connected to a current receiving part 123 through a coil 122. The coil 122 is provided with an armature 124, to which a lever 125 is pivotally mounted. The other end of the lever 125 is in contact with an ejector rod 126, the upper end of which is in contact with the end of the lever 117.

The operation of this device is as follows: when the current supplying bar 103 is depressed against the action of the spring 107, it is stopped with the roller 108 of the lever 110 resting on the projection 105 of the current supplying bar 103. This condition is effected by the fact that the tip 118 of the lever 117 is caught by the side edge 115 of the vertical lever 112 as shown in FIG. 10 and that the roller 109 of the lever 110 gets into contact with the roller 113 of the vertical lever 112, thereby to fix the lever 110. When the current supplying bar 103 is depressed, it comes into contact with the current receiving part 123. The contacts 119 and 120 of the thermostat 121 are not yet closed. When arc heat is generated at the end of the welding electrode by bringing the current supplying bar into contact therewith, the contacts 119 and 120 are closed by this heat and current flows from the current supplying bar 103 through the current receiving part 123 to the coil 122, so that the coil 122 is excited to attract the armature 124, thereby to raise the ejector rod 126 through the lever 125 and thus to push up the lever 117 with the end of the ejector rod 126. Therefore, the tip 118 of the lever 117 separates from the side edge 115 of the vertical lever 112, so that the roller 109 gets out of engagement with the roller 113 and the current supplying bar 103 rises under the action of the spring 107. By this, contact between the welding electrode and current supplying bar is broken and the current supplying device is disenergized. At the same time, the coil 122 is disenergized and its magnetic force vanishes.

Besides the described mechanism, a mechanism which retires the current supplying bar by sending the light of arc at the tip of the welding electrode can also be applied. Instead of the heat or light sensing section, a timer can also be used.

Figure 11:
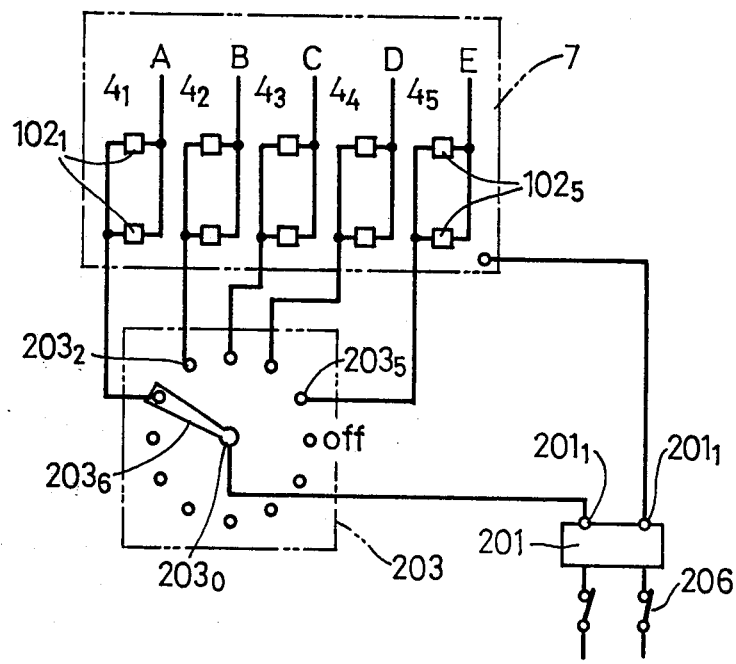
FIG. 11 is a connection diagram of the circuit used in the continuous lay down arc welding apparatus.

Referring to FIG. 11, the shown continuous lay down arc welding apparatus is capable of welding several lines by a single welding machine. In this case, one of the output terminals of a welding machine 201 is connected to a base metal 7 and the other through a change-over switch 203 to current supplying devices $102_1 - 102_5$ of the lines A – E. The lines are welded one after another by switching the change-over switch 203. Numerals $201_1$ designate the output terminals of the welding machine 201; $103_o$ a main terminal of the switch 203 provided on the rotating shaft thereof; $203_1 - 203_5$ selector terminals of the switch 203; $203_6$ a moving piece of the switch 203; $4_1 - 4_5$ lay down welding electrodes of the lines A – E; and 206 a power switch on the input side of the welding machine 201.

In operation, when the line A is to be welded, the moving piece $203_6$ of the change-over switch 203 is brought into contact with the selector terminal $203_1$ and the power switch 206 is closed, as shown in FIG. 11, so that the welding current flows through the main terminal $203_o$, moving piece $203_6$ and selector terminal $203_1$ of the switch 203 to the current supplying device $102_1$, thereby to weld the base metals 7 on the line A with the welding electrode $4_1$. After completion of welding the line A, the moving piece $203_6$ is turned to come into contact with the terminal $203_2$, so that the line B begins to be welded. By turning the moving piece of the change-over switch 203 for one line after another, all the lines can be continuously welded. If this change-over switch is arranged in a control center where a pilot lamp going out after every line has been welded is provided, all the lines can be quickly and surely welded only by turning the moving piece of the switch according to the indication of the pilot lamp. Simultaneous welding of several lines by several welding machines may be watched by a single operator to the advantage of management.

Figure 12A:
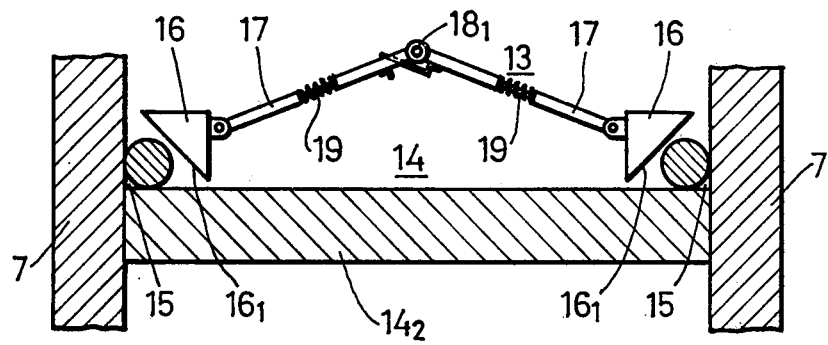
FIGS. 12a and 12b are side views of a pressure-holding device for continuous lay down arc welding electrode, said device being about to press the electrode in FIG. 12a and being in the position to pressure-hold it in FIG. 12b.
Figure 12B:
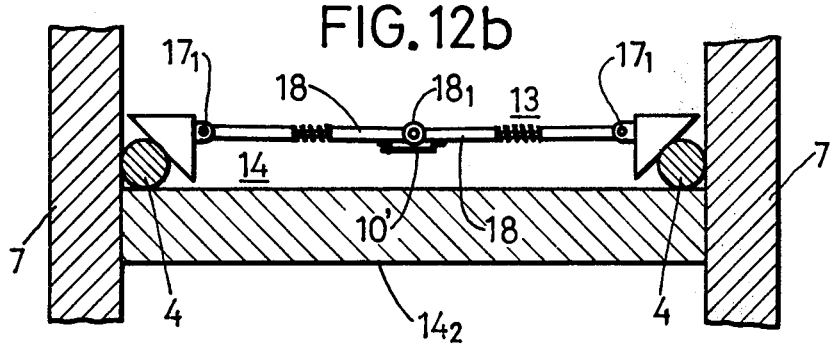

Now FIGS. 12a and 12b show a pressure-holding device for pressing the described lay down arc welding electrodes against the base metals.

The pressure-holding device 13 comprises pressing parts 16 made of copper, copper alloys or their equivalent materials and having a tapered face $16_1$ to lie against each of the welding electrodes 4 laid down along the weld lines 15 of the base metals 7 consisting of web parts $14_1$ and a flange part $14_2$, large-diameter pipes 17 pivotally mounted on the pressing parts at $17_1$, large-diameter rods 18 pivotally connected to each other at $18_1$ and small-diameter rods $18_2$ wound by coil springs 19 and formed integral with said large-diameter rods, said small-diameter rods being inserted in said large-diameter pipes.

In operation, in order to fix the welding electrodes 4 from the position of FIG. 12a, the joint $18_1$ is forced downwardly by means of a suitable handle, so that the coil springs 19 are elastically compressed to cause the small-diameter rods $18_2$ to move into the large-diameter pipes 17 until the large-diameter pipes, small diameter rods and large-diameter rods form a substantially straight line as shown in FIG. 12b.

To return the device to the position of FIG. 12a, the joint $18_1$ needs only to be lifted by means of the handle. It can be easily lifted due to the elasticity of the coil springs 19. The handle is operated repeatedly for every fixing operation of the welding electrodes.

Now referring to FIGS. 13a to 13e, devices for welding the front and rear ends of the base metals are explained.

FIG. 13a shows a device for welding the rear end of the base metals, in which the lay down arc welding electrode 4 is suitably pressure-held on the production $21_1$ of the weld line 21 of the base metals 7 consisting of a web material $20_1$ and a flange material $20_2$ and in which, when the arc reaches the end of the weld line, it is cut off automatically by the aforementioned pressure. Numeral 22 designates a jig for use in the method according to the present invention. The jig 22 comprises a magnet 23 detachable fixed to either the web material $20_1$ or the flange material $20_2$, an arm $22_1$ formed integral with said magnet, a supporting tube $22_3$ containing a coil spring $22_2$ having a pressing force in a particular direction, a grasping bar $22_5$ connected through a pressing spring $22_4$ to said tube and a fixing bar $22_6$, the latter two holding the end of the welding electrode in cooperation. A current supplying bar is designated at 103.

Referring to FIGS. 13b to 13e, a jig 24 having a desired shape and made of copper, copper alloys or their equivalents is arranged on the production $26_1$ of the weld line 26 of the base metals 7 consisting of a web material $25_1$ and a flange material $25_2$. The jig 24 supports thereon the front or rear end $4_1$ or $4_2$ of the continuous lay down arc welding electrode 4 projecting from the front or rear end $7_3$ or $7_4$ of the base metals 7. Numeral 103 designates an automatic current supplying device and $24_3$ a plate of the jig 24 made of iron or any other magnetic material (hereinafter referred to as an iron plate).

The use and effect of the described devices will now be explained for welding the front and rear ends of the base metals respectively.

(A) Welding the front end of the base metals:

FIG. 13b shows the front end of partd to be fillet welded. The base metals 7 consists of a web material $25_1$ and a flange material $25_2$. An L-shaped jig 24 made of copper or copper alloys (hereinafter referred to only as copper) is aligned to the production $26_1$ of the weld line 26 and magnetically fixed to either the web material $25_1$ or the flange material $25_2$ by means of a magnet 27 held thereon by bracket $27_1$. Then the front end $4_1$ of the welding electrode 4 is caused to project from the end $7_3$ of the base metal 7 and supported by the jig 24. When arcing is effected in this condition, the deposited metal solidifies without adhering to the surface of the jig, for arc is generated on the jig made of copper. Therefore, pretty beads are formed on the end of the base metals 7. The beads on the end of the base metals are the same in form, dimension and nature as those produced by the continuous lay down arc welding process. In this case, the welding electrode may be of the acidic or basic type.

Figure 13C:
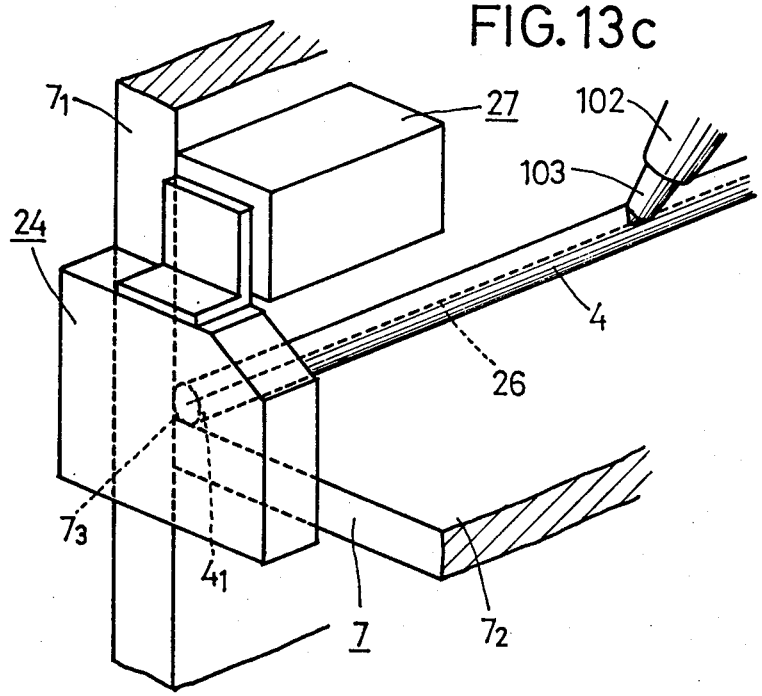

In FIG. 13c, a copper jig 24 is arranged at right angles to the weld line 26 and fixed by means of a magnet 27. The end $4_1$ of the welding electrode 4 about against the surface of the jig 24. When arcing is effected by starting the welding machine (not shown), the deposited metal and slug are blocked by the jig surface and thus cannot flow down. Consequently, beads good in appearance, form and dimension can be obtained. This method is, however, applicable only for welding electrodes producing acidic shag.

Figure 13D:
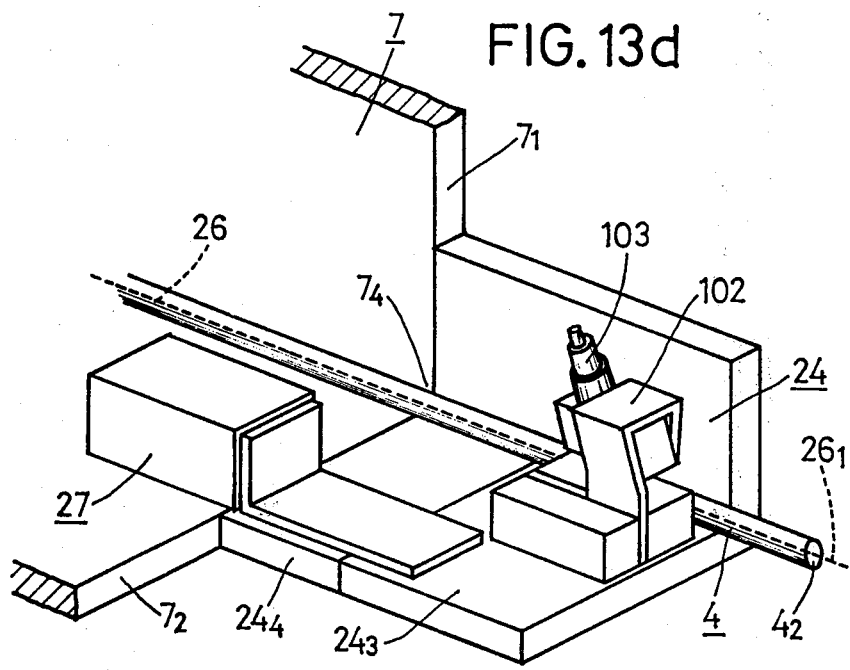
FIGS. 13d and 13e are perspective views of fillet welding sections showing the welding conditions of the front end of base metal.
Figure 13E:
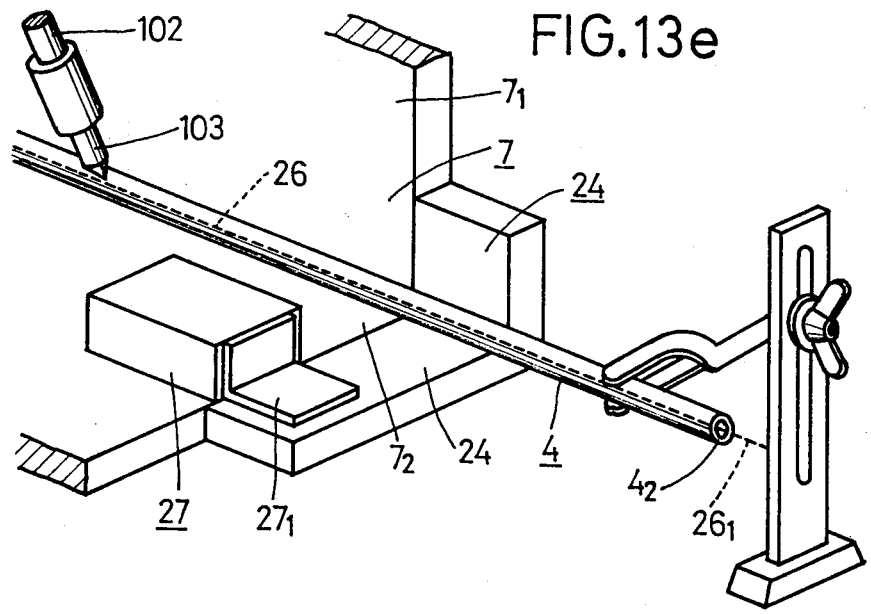

(B) Welding the rear end of the base metals:

As shown in FIG. 13d, an iron plate $24_3$ is joined with a copper plate $24_4$ for the web $24_1$ or flange $24_2$ or both of them of the jig 24. The automatic current supplying device 102 is placed on the iron plate. In this condition, normal continuous lay down arc welding is effected. When the arc reaches just beneath the current supplying device 102, the current supplying bar 103 separates from the welding electrode 4 and thus current to the welding electrode is cut off to cause the arc to disappear. While good beads can be formed continuously on the base metal section, the deposited metal on the jig 24 solidifies without adhering thereto, so that uniform and pretty beads are formed on the end $7_4$ of the base metal 7.

Thus, uniform and beautiful beads can be obtained throughout the whole weld line by combining the continuous lay down arc welding process with the methods of welding the front and rear ends of the base metals according to the present invention.

Since the described jigs are made of copper, copper alloys or their equivalents, they can be used repeatedly for a long period.

Figure 14:
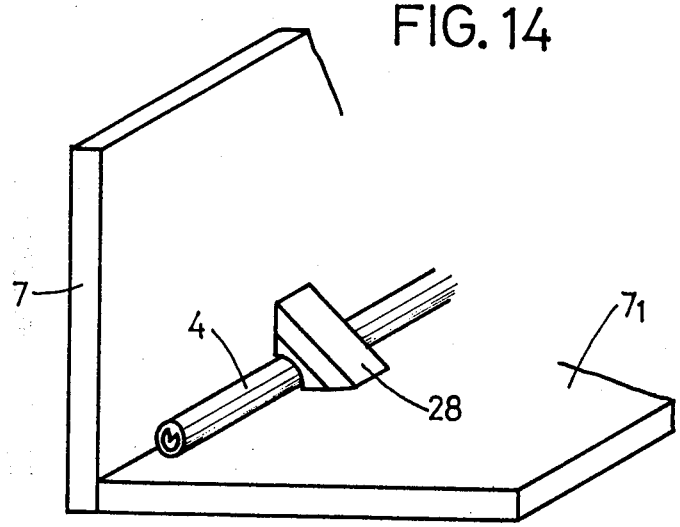
FIG. 14 is a sectional view of a weight for lay down arc welding electrode embodied according to the present invention.

FIG. 14 shows a weight for lay down arc welding electrode. In fillet welding, a weight 28 made of copper or copper alloys is placed on the welding electrode 4 laid down along the corner defined by the base metals 7 and $7_1$. In horizontal fillet welding, and vertical, horizontal and overhead position weldings, no or little slug flows through the weight if that part thereof which holds the welding electrode is in tight contact with or has only a small clearance against the welding electrode. It follows that the direction of arc is changed and the fluidity of slug varies, thus causing disturbance of beads. It has been found that the form and appearance of beads can be made the same on the sections with and without weight by selecting suitably the clearance between weight and welding electrode.

| Ratio of clearance sectional area to electrode sectional area (inclusive of flux) | Welding position | |
|---|---|---|
| | Horizontal fillet welding | Flat position welding |
| 0 | Beads disordered | Beads disordered |
| 0.2 | Good | Good |
| 0.4 | Do. | Do. |
| 0.6 | Do. | Do. |
| 0.8 | Do. | Do. |
| 1.0 | Do. | Do. |

It is apparent from this table that, when the ratio of clearance sectional area to electrode sectional area is over 0.2, the form and appearance of beads are acceptable. The beads become out of order when this value is zero, i.e., no clearance exists between weight and electrode.

The weight according to the present invention is made of copper or copper alloys and has a magnet on that surface which is to come into contact with the base metal. In horizontal, vertical and overhead position weldings, the weight is magnetically attached to the base metal. As the result, a floating electrode is strongly pressed against the base metal, thus making the arc length short and forming good beads.

Several embodiments of the joint for lay down arc welding electrodes according to the present invention are shown in FIGS. 15a to 15e. Referring to FIGS. 15a to 15c, there is shown a projection 29 provided on the core wire 1. This projection 29 engages into a corresponding recess 30 provided on one end of another welding electrode 4 to constitute a joint. In this way, a very long welding electrode can be produced. When a plurality of welding electrodes are connected in such a manner as shown in FIGS. 15b and 15c, welding of corners can be easily performed. In FIG. 15d, both electrodes to be joined have a recess 30' in the core wire on the opposed ends, in which a member 29' of substantially the same material as the core wire is fitted. Both welding electrodes are integrally held by this joint. A joint 30'' shown in FIG. 15e comprises a tube 31 whose inner diameter is substantially equal to the outer diameter of the core wire 1. The tube 31 is covered with a flux 2 to such a thickness that the outer diameter thereof is equal to that of the welding electrode 4. The joint 30'' is fitted on the ends of the welding electrodes from which the flux is removed.

What is claimed is:

1. The lay down arc welding method comprising the steps of placing two longitudinally disposed generally flat metal pieces to be welded together in contiguous contact with an angle less than 180° therebetween to form at the junction thereof a longitudinal root of the angle adjacent the seam between the two pieces, disposing about a longitudinal welding electrode metal core wire of a size in the order of fifty square millimeters in cross section a flux layer surrounding at least a portion of said core wire with a part of the flux layer about said wire being thinner than the remainder thicker portion of said flux layer about said wire, laying down the core wire in said root of said angle with said thinner flux layer adjacent the two pieces and the thicker portion most remote from said seam, and connecting an arc producing voltage source between said two metal pieces and said core wire thereby to produce a shortened arc length between said electrode and the two metal pieces adjacent said seam with a decreased divergent angle from the wire core to the root of the weld thereby resulting in improved penetration of the metal deposited at said seam from the core wire to produce a weld.

2. The method defined in claim 1 including the step of forming a longitudinally disposed flat face on a core wire of generally circular cross section and disposing the flux layer surrounding said core wire in a substantially cylindrical pattern thereby to present said thicker portion of said flux layer adjacent said flat face.

3. The method defined in claim 1 including the step of forming in said flux layer a curved longitudinally disposed face.

4. The method defined in claim 1 including the step of forming a longitudinal notch in said flux to continuously expose said core wire.

5. The method defined in claim 1 including the step of shaping the core wire in substantially a rectangular cross section.

* * * * *